United States Patent
Vijayakumar et al.

(10) Patent No.: US 11,363,470 B1
(45) Date of Patent: Jun. 14, 2022

(54) SYSTEMS AND METHODS FOR BEAM SWEEPING OPTIMIZATION BASED ON A SERVICE THRESHOLD

(71) Applicant: T-MOBILE INNOVATIONS LLC, Overland Park, KS (US)

(72) Inventors: Maheswaran Vijayakumar, Herndon, VA (US); Muthukumaraswamy Sekar, Herndon, VA (US); Sathyanarayanan Raghunathan, Herndon, VA (US); Suresh Majjara, Herndon, VA (US)

(73) Assignee: T-Mobile Innovations LLC, Overland Park, KS (US)

( * ) Notice: Subject to any disclaimer, the term of this patent is extended or adjusted under 35 U.S.C. 154(b) by 28 days.

(21) Appl. No.: 16/556,971

(22) Filed: Aug. 30, 2019

(51) Int. Cl.
*H04W 16/28* (2009.01)
*H04W 56/00* (2009.01)
*H04W 24/02* (2009.01)
*H04B 7/06* (2006.01)
*H04L 41/5003* (2022.01)
*H04L 43/16* (2022.01)

(52) U.S. Cl.
CPC .......... *H04W 16/28* (2013.01); *H04B 7/0626* (2013.01); *H04L 41/5003* (2013.01); *H04L 43/16* (2013.01); *H04W 24/02* (2013.01); *H04W 56/001* (2013.01)

(58) Field of Classification Search
None
See application file for complete search history.

(56) References Cited

U.S. PATENT DOCUMENTS

| | | | |
|---|---|---|---|
| 2004/0242272 A1* | 12/2004 | Aiken | H01Q 1/246 455/562.1 |
| 2013/0182683 A1* | 7/2013 | Seol | H04B 7/0695 370/335 |
| 2014/0120926 A1* | 5/2014 | Shin | H04W 56/00 455/450 |
| 2017/0141830 A1* | 5/2017 | Cheng | H04B 7/0682 |
| 2017/0214439 A1* | 7/2017 | Shtrom | H04B 7/0413 |
| 2017/0353960 A1* | 12/2017 | Heninwolf | H04B 7/0617 |
| 2018/0359717 A1* | 12/2018 | Akkarakaran | H04W 52/0261 |
| 2019/0090185 A1* | 3/2019 | Rune | H04L 5/0048 |
| 2019/0313351 A1* | 10/2019 | Kim | H04W 72/0453 |
| 2019/0372646 A1* | 12/2019 | Faronius | H04W 52/241 |
| 2020/0153498 A1* | 5/2020 | Kotecha | H04B 7/0695 |
| 2021/0084611 A1* | 3/2021 | Kenington | H04B 7/0469 |

FOREIGN PATENT DOCUMENTS

EP 2129173 A1 * 12/2009 ........... H04B 7/0617

* cited by examiner

*Primary Examiner* — Alpus Hsu
*Assistant Examiner* — Camquyen Thai

(57) ABSTRACT

Systems and methods are provided for optimizing intra-cell beam sweeping based on a service threshold. The system transmits a plurality of beams including a first beam at a first direction. When it is determined that a first feedback from a user device is below a service threshold, the system will associate the first beam with a second direction. Then, the system will transmit the plurality of beams with the first beam at a second direction.

17 Claims, 6 Drawing Sheets

SYSTEMS AND METHODS FOR BEAM SWEEPING OPTIMIZATION BASED ON A SERVICE THRESHOLD

TECHNICAL FIELD

The present invention relates to optimizing intra-cell beam sweeping in telecommunications environments as shown in and/or described in connection with at least one of the figures, and as set forth more completely in the claims.

SUMMARY

A high-level overview of various aspects of the invention are provided here for that reason, to provide an overview of the disclosure, and to introduce a selection of concepts that are further described in the detailed description section below. This summary is not intended to identify key features or essential features of the claimed subject matter, nor is it intended to be used as an aid in isolation to determine the scope of the claimed subject matter.

In brief, and at a high level, this disclosure describes, among other things, optimizing intra-cell beam sweeping based on a service threshold. When one beam services a low number of users, other users are not given sufficient network access. Therefore, using a service threshold, the direction(s) utilized when performing beam sweeping may be modified to provide sufficient network access to a greater number of users. For example, a plurality of beams may be transmitted in a plurality of directions for a cell site. A first beam in the plurality of beams may be transmitted in a first direction. A feedback signal may be received from a user device and the feedback signal may be used, by a base station, to determine whether the first beam is at or below the service threshold. When the first beam is below the service threshold, the first beam may be associated with a second direction that is different than the first direction. Then, when the plurality of beams may be subsequently transmitted in the plurality of directions, the first beam may be transmitted in the second direction instead of the first direction.

BRIEF DESCRIPTION OF THE DRAWINGS

Illustrative embodiments of the present invention are described in detail below with reference to the attached drawing figures, and wherein.

DETAILED DESCRIPTION OF THE INVENTION

Figure 1:
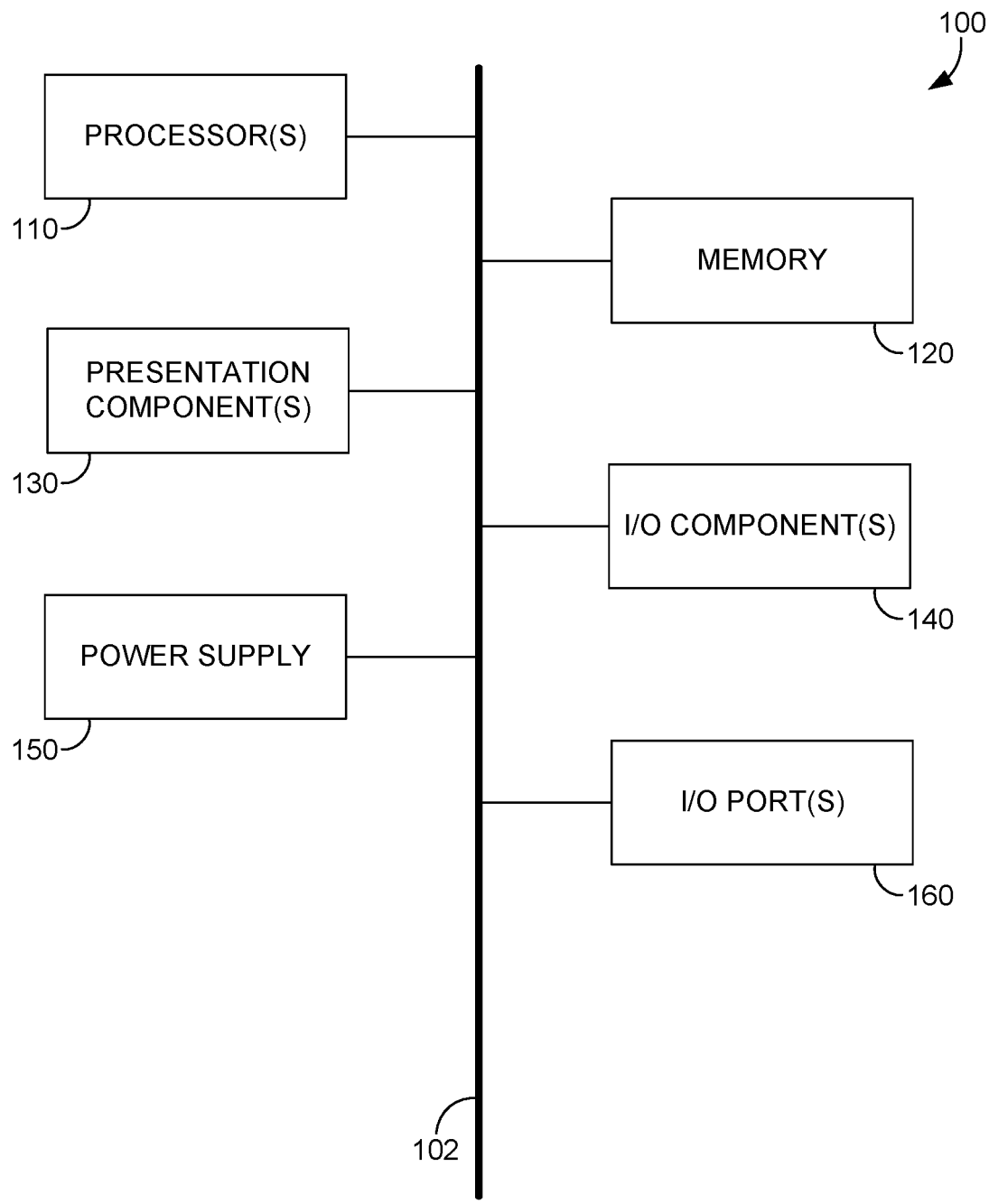
FIG. 1 is a block diagram that illustrates an exemplary computing system in accordance with an embodiment of the invention.

The subject matter of embodiments of the present invention is described with specificity herein to meet statutory requirements. But the description itself is not intended to necessarily limit the scope of claims. Rather, the claimed subject matter might be embodied in other ways to include different steps or combinations of steps similar to the ones described in this document, in conjunction with other present or future technologies. Terms should not be interpreted as implying any particular order among or between various steps herein disclosed unless and except when the order of individual steps is explicitly described.

Embodiments of the invention are directed to optimizing intra-cell beam sweeping based on a service threshold. In some embodiments, a first beam is transmitted in a first direction. User devices may provide a first feedback signal, which in some embodiments, may comprise channel state information (CSI) signal. In some embodiments, the base station may determine whether the first feedback signal is at or below a service threshold based on a quantity (or lack thereof) of user devices recognized. Using the feedback signal and the service threshold, beam sweeping may be optimized as further described hereinafter. When the first beam is less than the service threshold, for example, the first beam may be associated with a second direction, instead of the first direction. The first beam may then be transmitted in the second direction, based on the new association of the first beam with the second direction, in an embodiment. In some embodiments, a base station may predict or have information from at least one feedback signal that the second direction may be at or above the service threshold. In one embodiment, a second feedback signal may be received from a plurality of user devices with regard to the transmission of the first beam in the second direction. The second feedback signal may be used by the base station to determine that the first beam transmitted in the second direction meets or is above the service threshold, in one embodiment. In another embodiment, the second feedback signal may be used by the base station to determine that the first beam transmitted in the second direction is below the service threshold, and in one such embodiment, the first beam may be associated with a third direction that is different than the first and second directions. The first beam may be subsequently transmitted in the third direction when performing beam sweeping, for example, in an effort to provide service to a greater number of user devices at the cell site.

Throughout the description of the present invention, several acronyms and shorthand notations are used to aid the understanding of certain concepts pertaining to the associated system and services. These acronyms and shorthand notations are solely intended for the purpose of providing an easy methodology of communicating the ideas expressed herein and are in no way meant to limit the scope of the present invention. The following is a list of these acronyms:

3G Third Generation Wireless Technology
3GPP Third Generation Partnership Project
4G Fourth Generation Wireless Technology
5G Fifth Generation Wireless Technology
CDMA Code Division Multiple Access
CD-ROM Compact Disk Read Only Memory
CRI Index
CSI Channel State Information (Uplink)
CSI-RS Channel State Information Reference Signal (Downlink)
DVD Digital Versatile Discs
EEPROM Electrically Erasable Programmable Read Only Memory
E-UTRAN Evolved Universal Terrestrial Access Network
gNB Next Generation Node B GPRS General Packet Radio Service
GSM Global System for Mobile Communications
iDEN Integrated Digital Enhanced Network
LTE Long Term Evolution
MDN Mobile Device Number
NAI Network Address Identifier
OFDMA Orthogonal Frequency Division Multiple Access
PBCH Physical Broadcast Channel (Uplink)
PC Personal Computer
PCS Personal Communications Service
PDA Personal Digital Assistant
PMP Portable Media Player
PSTN Public Switching Telephone Network
RAM Random Access Memory
ROM Read Only Memory
RSRP Reference Signals Received Power
RSRQ Reference Signals Received Quality
SIB Signal Information Resource Block
SINR Signal to Interference Plus Noise Ratio
SMS Short Message Service
SS/PBCH Synchronization Signal/Physical Broadcast Channel (Downlink)
TDMA Time Division Multiple Access
UE User Equipment
UMTS Universal Mobile Telecommunications System
WCDMA Wideband Code Division Multiple Access
WiMAX Worldwide Interoperability for Microwave Access Further, various technical terms are used throughout this description. An illustrative resource that describes these terms may be found in Newton's Telecom Dictionary, 27th Edition (2012).

A "user device" as used herein, is a device that has the capability of using a wireless communications network. The term "user device" may be used interchangeably with the terms "mobile device," "wireless communication device," or "user equipment" (UE) for simplicity, and thus the terms should not be construed as limiting. A user device may take on a variety of forms, such as a personal computer (PC), a laptop computer, a tablet computer, a mobile phone, a personal digital assistant (PDA), a server, a smart phone, a smart watch, a wearable computer, a CD player, an MP3 player, a global positioning system (GPS) device, a video player, a handheld communications device, a workstation, a router, a hotspot, or any other device that is capable of communicating with other devices using a wireless communications network. Additionally, the user device may be used with different technologies or standards, including, but not limited to, 3G, 4G, 5G, LTE, CDMA, CDMA 1xA, GPRS, EvDO, TDMA, GSM, WiMax technology, LTE, and/or LTE Advanced, or any other type of network. Further, a user device may comprise one or more components, such a display, a power source, a data store, an audio component (e.g., speaker), a memory, a buffer, a radio transmitter, and/or the like.

The term "cell site" is used herein to discuss an access point that is configured to provide user devices with access to a wireless communications network. For example, a cell site may include a cell tower having an antenna and/or antenna arrays that provide a coverage area to user devices in range of the cell tower. The term "cell site" may be used interchangeably herein with "access point" or "cell tower" for simplicity. Examples of a cell site include macro cells such as a cell tower controlled by a gNodeB, as well as small cells, such as a femto cell or pico cell. As such, the scale and coverage area of the cell site is not limited to the examples discussed, and various cells sites and corresponding coverage areas are contemplated to be within the scope of the invention.

Embodiments of the present invention may be embodied as, among other things: a method, system, or set of instructions embodied on one or more computer-readable media. Computer-readable media include one or more of volatile or nonvolatile media, removable or non-removable media, and computer-readable media contemplates media readable by a database, a switch, and various other network devices. In embodiments, computer-readable media comprises media implemented in any method or technology for storing information. Examples of stored information include computer-useable instructions, data structures, program modules, cloud-based storage, network-based storage, and other data representations. Media examples include information-delivery media, primary storage media such as RAM, and secondary storage media such as a hard drive. Media example may include ROM, EEPROM, flash memory, or other memory technology, CD-ROM, digital versatile discs (DVD), Blue-ray disc, holographic media, optical disc storage, magnetic cassettes, magnetic tape, magnetic disk storage, and other magnetic storage devices. These technologies can store data momentarily, temporarily, or permanently. As used herein, computer-readable storage media does not comprise a signal per se.

As discussed hereinafter, a computer system and a method may optimize intra-cell beam sweeping based on a service threshold. In some embodiments, a first beam of a plurality of beams may be transmitted in a first direction of a plurality of directions at a cell site. At least one feedback signal may be received subsequent to transmitting the first beam, and the at least one feedback signal may include at least one unique user device identifier that are associated with at least one user device, in an embodiment. The at least one feedback signal may be used to determine that the first beam is at or below a service threshold, for example, based on a quantity of the at least one user device that are served by the first beam. Based on determining that the first beam is at or below the service threshold, the first beam may be associated with a second direction of the plurality of directions, in an embodiment. The second direction is generally different than the first direction, in various embodiments. The plurality of beams may subsequently be transmitted in the plurality of directions so that the first beam may be transmitted in the second direction. As such, intra-cell beam sweeping may be optimized by changing the direction of the first beam that does not meet the service threshold when broadcast in a first direction, for example, wherein broadcasting the first beam in the second direction may enable the first beam to provide service to a greater number of user devices relative to the first direction.

In another embodiment, a system may comprise a gNodeB that is configured to control a cell site having an antenna for transmitting a plurality of beams in a plurality of directions to form a synchronization signal block (SSB) burst. Further, the system may include one or more processors communicatively coupled to the gNodeB. The one or more processors may cause the plurality of beams to be transmitted in a plurality of directions. A first beam in the plurality of beams is transmitted in a first direction of the plurality of directions. The one or more processors may also receive at least one feedback signal subsequent to transmitting the plurality of beams, wherein the at least one feedback signal may include one or more unique user device identifiers associated with one or more user devices that are served by the first beam. The at least one feedback signal may be used to determine that a first beam is at or below a service threshold based on a quantity of the one or more user devices that are served by the first beam. Based on determining that the first beam is at or below the service threshold, the first beam may be associated with a second direction in the plurality of directions, wherein the second direction is different than the first direction. Subsequently, the plurality of beams may be caused to be transmitted in the plurality of directions, wherein the first beam is transmitted in the second direction.

Embodiments herein for optimizing intra-cell beam sweeping have many advantages over other systems and solve technological problems or shortcomings in those other systems. For example, when a single beam is transmitted in a first direction, the beam may provide service to a relatively small number of user devices within the coverage of the beam oriented in the first direction. In the same manner, another beam transmitted in another direction may provide service to a relatively high number of user devices. Because the initial transmission directions in which beams are transmitted from a cell site may be predetermined and static ("fixed"), the connectivity provided by the cell site may be unbalanced, with one beam being underutilized due to the relatively few user devices served and another beam being over utilized by the relatively large number of user devices served. A beam that serves too many user devices may provide degraded wireless network connectivity and impaired wireless network service to the user devices. A beam that serves too few user devices may have excess network resources that are not being leveraged in comparison to an over utilized beam, for example. It can therefore be desirable for a distribution of user devices served by each beam of a cell site to be balanced or controlled so as to serve a greater number of user devices across one or more of the plurality of beams, thus providing improved connectivity to each user device. Optimizing intra-cell beam sweeping, therefore, may be achieved by determining the number of user devices that are served by a particular beam, and changing the direction of particular beams when a service threshold (e.g., a number of user devices) is not met.

Referring to the drawings, FIG. 1 is a block diagram that illustrates an exemplary computer system 100 in accordance with an embodiment of the invention. The computer system 100 is but one example of a suitable environment and is not intended to suggest any limitation as to the scope of use or functionality of the embodiments of the invention. Neither should computer system 100 be interpreted as having any particular dependency or requirement relating to any one or combination of modules or other components illustrated.

The computer system includes a bus 102 that directly or indirectly couples the following components: one or more processors 110, memory 120, one or more presentation components 130, input/output (I/O) components 140, I/O ports 160, and an illustrative power supply 150. Bus 102 represents what may be one or more buses (such as an address bus, data bus, or combination thereof). Although the various blocks of FIG. 1 are shown with lines for the sake of clarity, in reality, delineating various modules is not so clear, and metaphorically, the lines would more accurately be grey and fuzzy. For example, one may consider presentation components 130, such as a display screen, to be the I/O components 140. Also, the one or more processors 110 may have memory 120. The inventors hereof recognize that such is the nature of the art, and reiterate that the diagram of FIG. 1 is merely illustrative of an exemplary device that can be used in connection with one or more embodiments.

Computer system 100 typically includes memory 120, which may include one or more various types and kind of data storage (e.g., computer-readable media). The memory 120 may include a secure element that stores personal and credit credentials for a user of the wireless device. The personal information may include authentication codes defined by the user of the wireless device. By way of example, and not limitation, memory 120 may comprise Random Access Memory (RAM); Read Only Memory (ROM); Electronically Erasable Programmable Read Only Memory (EEPROM); flash memory or other memory technologies; CD-ROM, DVD or other optical or holographic media; and magnetic cassettes, magnetic tape, magnetic disk storage or other magnetic storage devices.

Computer system 100 includes one or more processors 110 that read data from various entities such as memory 120 or I/O components 140. The processors 110 are used to initiate or perform and execute any portions of the methods discussed herein.

Memory 120 includes computer-storage media in the form of volatile and/or nonvolatile memory. Memory 120 may be removable, non-removable, or a combination thereof. Exemplary devices for memory 120 include solid-state memory, hard drives, optical-disc drives, etc.

Presentation components 130 present data indications to a user or other device. Exemplary presentation components 130 include a display screen, speaker, vibrating module, etc. I/O ports 160 allow computer system 100 to be logically coupled to other devices including I/O components 140, some of which may be built in. Illustrative components include a keyboard, microphone, cursor or focus-movement buttons, satellite device, touch pad or touch screen, scanner, etc.

As one of ordinary skill in the art will appreciate, the inner workings of the computer system 100 can constitute thousands of components, instructions, and the like. As previously discussed, the distinct lines in the figures herein are simplified and merely representative figures due to the actual interoperability of many of those components. A block diagram representing interaction of certain components of the computer system 100 according to embodiments of the invention is depicted in greatly simplified form and will be described below. in various embodiments, the computer system 100 may be a base station, or alternatively, a user device.

In one embodiment, a computer system 100 is configured to control a cell site to optimize the intra-cell beam sweeping based on a service threshold. The computer system 100 may include a gNodeB and one or more processors. The gNodeB may be configured to control a cell site with an antenna for transmitting a plurality of beams in a plurality of directions, for example, to form a synchronization signal block SSB burst. In some embodiments the plurality of beams are transmitted in different preset directions which may prevent interference and redundant transmissions.

The one or more processors may be communicatively coupled to the gNodeB. The one or more processors may cause a plurality of beams to be transmitted in a plurality of directions, with a first beam in the plurality of beams transmitted in a first direction of the plurality of directions. The one or more processors may receive at least one feedback signal subsequent to transmitting the plurality of beams. The at least one feedback signal may include one or more unique user device identifiers associated with one or more user devices that are served by the first beam. The one or more processors may use the at least one feedback signal to determine that a first beam is below a service threshold based on a quantity of the one or more user devices that are served by the first beam. The one or more processors may associate, based on determining that the first beam is below the service threshold, the first beam with a second direction in the plurality of directions and, in some embodiments, the second direction may be different than the first direction. The one or more processors may also subsequently cause the plurality of beams to be transmitted in the plurality of directions and the first beam may be transmitted in the second direction.

Figure 2:
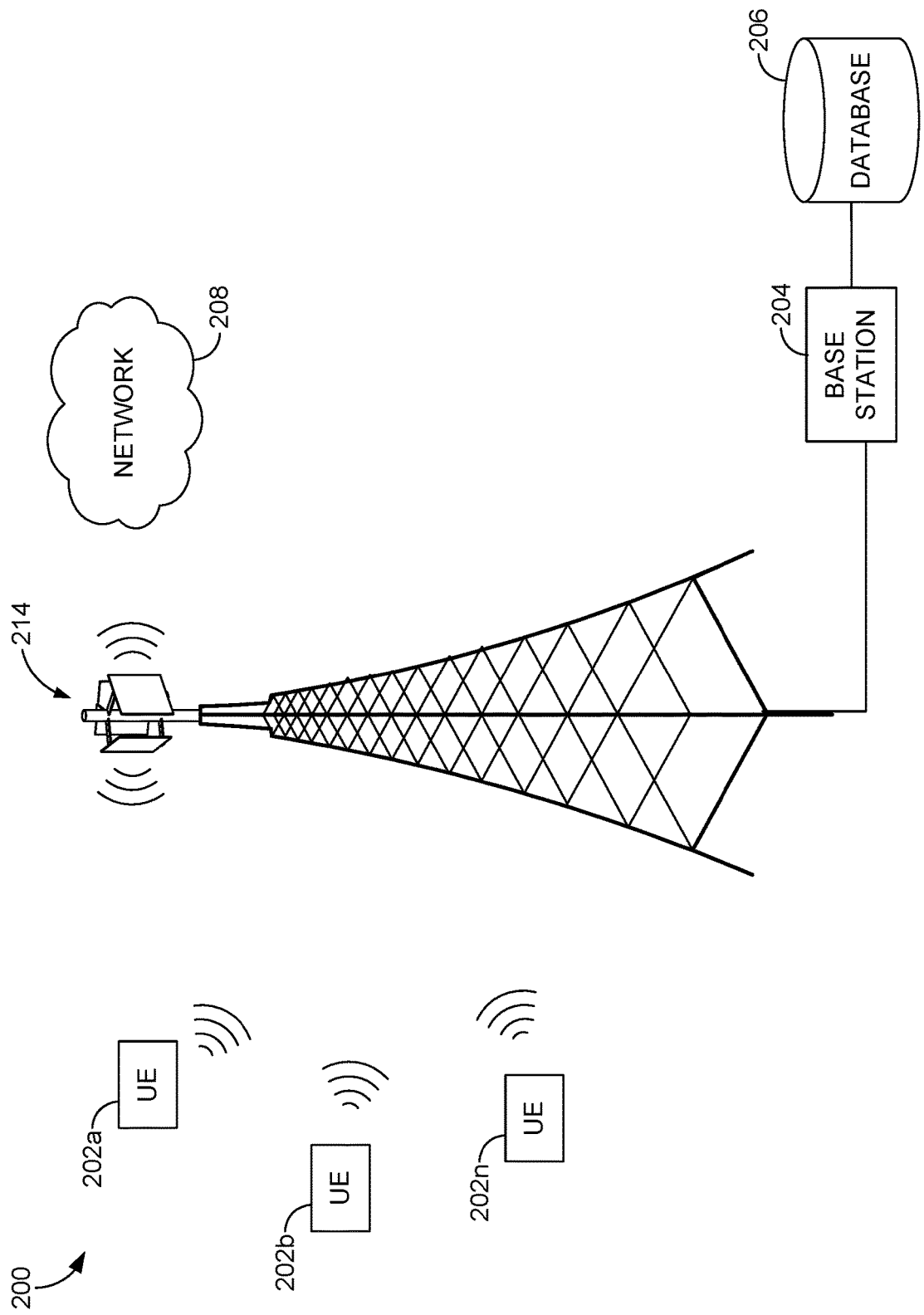
FIG. 2 illustrates a diagram of an exemplary network environment in accordance with an embodiment of the invention.

FIG. 2 provides an exemplary network environment 200 in accordance with an embodiment. Network environment 200 is but one example of a suitable network environment and is not intended to suggest any limitation as to the scope of use or functionality of the invention. Neither should the network environment 200 be interpreted as having any dependency or requirement relating to any one or combination of components illustrated.

Network environment 200 includes a user device (UE), such as the UE 202a, 202b, and 202n, access point 214, database 206, network 208, and base station 204, for example. In network environment 200, the UE 202a, 202b, and 202n may take on a variety of forms, as previously discussed with regard to the term "user device." The UE 202a, 202b, and 202n may be configured to communicate via wireless communications with the access point 214 in order to interact with a public or private network, such as network 208. In some embodiments, the UE 202a, 202b, and 202n are each associated with a unique user device identifier. The unique user device identifier may be provided to the base station 204, via the access point 214, using at least one feedback signal as sent from the UE 202a, 202b, and 202n. The unique user device identifiers, in some embodiments, may be a phone number, device ID, or other device specific representation. The base station 204 may use the unique user device identifiers to identify and individually recognize each of the UE 202a, 202b, and 202n within the network environment 200.

In some embodiments, the UE 202a, 202b, and 202n in network environment 200 can optionally utilize network 208 to communicate with other computing devices (e.g., a mobile device(s), a server(s), a personal computer(s), etc.) through access point 214. The network 208 may be a telecommunications network(s), or a portion thereof, in some embodiments. A network might include an array of devices or components, which are not shown in FIG. 2 for simplicity. The devices or components of such a network may form network environments similar to what is shown in FIG. 2, and may also perform methods in accordance with the present disclosure. Components such as terminals, links, and/or nodes (as well as other components) can provide connectivity, in various embodiments. In some embodiments, network 208 can include multiple networks, as well as being a network of networks, but is shown in a more simple form so as to not obscure other aspects of the present disclosure.

Network 208 can be part of a telecommunication network that connects subscribers to their immediate service provider, for example. In some instances, network 208 can be associated with a telecommunications provider that provides services (e.g., LTE) to user devices, such as the UE 202a, 202b, and 202n. For example, network 208 may provide voice, SMS, and/or data services to at least one of the UE 202a, 202b, and 202n that are registered or subscribed to utilize the services provided by a telecommunications provider. In some embodiments, network 208 can comprise any communication network providing voice, SMS, and/or data service(s), such as, for example, a 1× circuit voice, a 3G network (e.g., CDMA, CDMA2000, WCDMA, GSM, UMTS), a 4G network (WiMAX, LTE, HSDPA), or a 5G network.

In some embodiments, access point 214 is configured to communicate with at least one of the UE 202a, 202b, and 202n that are located within the geographical area covered by beams that are formed using at least one radio antenna of the access point 214. The access point 214 may include radios, antennas, antenna arrays, power amplifiers, transmitters/receivers, digital signal processors, control electronics, GPS equipment, and the like, in embodiments. Each of these components may aid in the access point's 214 communication with the UE 202a, 202b, and 202n, in embodiments. In particular, access point 214 may selectively communicate with at least one of the UE 202a, 202b, and 202n using beamforming, in some embodiments. Communication via the access point 214 may be bilateral, with the access point 214, in some embodiments, capable of receiving feedback signals that include unique user device identifiers of at least one, or each of, the UE 202a, 202b, and 202n. The access point 214 may be geographically co-located with base station 204, in one embodiment. The access point 214 be geographically remote from base station 204, in another embodiment.

As shown, access point 214 may be in communication with base station 204. The base station 204 may comprise components that are utilized, in various embodiments, to perform one or more methods for optimizing beam sweeping based on a service threshold. In some embodiments, it is contemplated that the base station 204 may be a gNodeB. Generally, the base station 204 may be configured to control the access point 214 to form a plurality of beams that are transmitted or broadcast in a plurality of directions.

The base station 204 may include a communication component and various components for controlling the various functions of the access point 214. The base station 204 may include one or more processors, for example, in order to control the various functions of the access point 214. In some embodiments, the communication component of base station 204 may receive a first feedback signal from at least one of the UE 202a, 202b, and 202n. For example, at least one of the UE 202a, 202b, and 202n may transmit a feedback signal that is received by the access point 214, and provided to the base station 204 through the access point 214. The feedback signal may be transmitted by the UE 202a, 202b, and 202n, for example, in response to receipt of one or more of the plurality of beams transmitted from the access point 214. In one embodiment, each of the UE 202a, 202b, and 202n provide distinct feedback signals.

Beamforming may make use of the feedback signals to create UE specific beams. For example, the feedback signal received by the base station 204 may be transmitted on the uplink from the UE 202a, 202b, and 202n. Subsequently, the base station 204 may use the feedback signal to determine whether a beam formed between the access point 214 and at least one of the UE 202a, 202b, and 202n meets, exceeds, or is below, a service threshold, in embodiments. For example, in some embodiments, the service threshold is a predefined quantity of UE. In a further embodiment, the service threshold may specify a desired minimum number of UE to be served by any one beam at the access point 214, or a minimum number of UE to be served by a particular beam at the access point 214. The base station 204 may be preconfigured with the service threshold, in some embodiments. In another embodiment, the predetermined service threshold may be "pushed" to the base station 204, such that the service threshold may be modified or updated over time.

Using the at least one feedback signal sent by at least one of the UE 202a, 202b, and 202n, the base station 204 may determine the quantity of UE (i.e., the UE 202a, 202b, and 202n) that are detected within a particular beam. The number of the UE 202a, 202b, and 202n served by a single beam, can, as mentioned, be above or below a service threshold. The service threshold may be a value, a function, and/or may be determined using one or more processors. In some embodiments, a preassigned value for the service threshold may be set by an administrator for the access point 214, the base station 204, or both. The service threshold may be a preassigned value that is specific to a particular antenna, array, array elements, or the like. Additionally or alternatively, the service threshold may be calculated, dynamically, based on a total number of the UE 202a, 202b, and 202n being served by the access point 214 at a particular time or within a defined duration of time. For example, the service threshold may be a preassigned value of 100, wherein the preassigned value of 100 defines a desired number of UE. In this example embodiment, the base station 204 may receive, after transmitting a first beam, a detection of a quantity of 98 distinct UE. In this example embodiment, the actual number of UE served by the single beam is below the service threshold of 100 and the direction of the first beam may be changed accordingly. In a separate example, where the service threshold may be calculated dynamically, the total number or UE served by the access point may be adjusted depending on the number of UE in the area at a given time of day, or automatically after a quantity of UE are within service range. In this example embodiment, the base station 204 may, on average, serve a quantity of UE and the service threshold may be set dynamically at a predefine value of 120 desired UE based on the average In this example, if more than 120 UE are detected over a period of time (e.g., a time interval) the service threshold may be shifted to a new predefined value of 200 desired UE, or more, until there are consistently fewer than a quantity of 200 UE over a subsequent period of time.

Feedback signals from the UE 202a, 202b, and 202n may include data such as location information of the UE 202a, 202b, and 202n and/or network parameters determined at or by the UE 202a, 202b, and 202n, such as communication channel quality (e.g., signal-to-interference-plus-noise ratio (SINR), path loss) and/or device power levels (e.g., maximum uplink powers and/or maximum total uplink power). Location information in the feedback signals may be based on GPS or other satellite location services, terrestrial triangulation, an access point location, or any other means of obtaining coarse or fine location information. Network parameters may indicate a realized uplink and/or downlink transmission data rate, observed SINR and/or signal strength at the UE, path loss, or throughput of the connection. Location information and/or network parameters may take into account the hardware or software capabilities of the UE 202a, 202b, and 202n, such as the number of antennas and/or the type of access point 214 used for detection of the UE 202a, 202b, and 202n, in an embodiment. Additionally or alternatively, the data may comprise path loss between the UE 202a, 202b, and 202n and the access point 214, and/or sector interference in a predetermined geographical region or location, in some embodiments. Further, the base station 204 may collect the feedback signals sent by the UE 202a, 202b, and 202n at predetermined time intervals throughout the day, or continuously after each beam is transmitted, though any and all variations of collection intervals are contemplated herein such that these examples should not be construed as limiting.

As mentioned previously, the feedback signals may include at least one unique user device identifier associated with at least one of the UE 202a, 202b, and 202n that are served by a first beam. In some embodiments, the feedback signals may be a channel state information signal. In some embodiments, the UE 202a, 202b, and 202n may use the first beam to transmit the feedback signal to the access point 214. The base station 204 may calculate the total number of the UE 202a, 202b, and 202n served by a particular, individual beam, using these unique identifiers. The base station 204 may determine whether the total number of the UE 202a, 202b, and 202n is above or below the service threshold, for example, by determining a number of unique user device identifiers received in feedback signals via the first beam. The base station 204 may determine the actual number of UE being served by the first beam, and then reference the service threshold for comparison.

As discussed above, the service threshold may be a predefined quantity or value that refers to UE. For example, the service threshold may specify a minimum quantity of UE that are desired to be served by, or within the coverage of, one beam (e.g., six UE), and/or may specify a lower range of UE (e.g., 10 to 15 UE) that are desired to be served by, or within the coverage of, one beam. The service threshold may generally represent a number that, when a total quantity of UE being concurrently served by the beam does not meet the number, is indicative of the beam being underutilized.

For example, when the service threshold indicates ten UE are desired per one beam, the base station 204 may determine that a total number of UE actually or concurrently served by the particular, individual beam is three, and then the base station 204 may determine the particular, individual beam is below the service threshold (i.e., the beam is only serving three UE which is less than the minimum of ten UE specified in the service threshold). Based on the determination that the service threshold is not met, the base station 204 may automatically associate a new or different direction with the beam that is only concurrently serving three UE. Then, the beam may be broadcast in the new or different direction in an effort to capture a greater number of UE with that particular beam. In another example, the base station 204 may determine that the total number of UE concurrently served by one particular beam is 12 when the service threshold indicates eight UE are desired per beam. In this example, the base station 204 may determine that the beam is above the service threshold and the beam direction is not shifted based on the service threshold being met.

When the beam is determined to be below the service threshold, the base station 204 may select and associate the beam with a new or different direction relative to the current direction (i.e., current or previous direction is associated with the beam as not meeting the service threshold). In some embodiments, the new or different direction may be selected by the base station as being next in a predetermined sequence of a limited number of available preset directions. In some embodiments, the new or different direction may be calculated by the base station 204, based on previous feedback signals from the UE 202a, 202b, and 202n. In one embodiment, the new direction may be selected at random by the base station 204. By associating the beam with a new or different direction, thus changing the direction of the beam when the service threshold is not met, the beam may be shifted to provide coverage in a different direction that may meet or exceed the service threshold.

Figure 3:
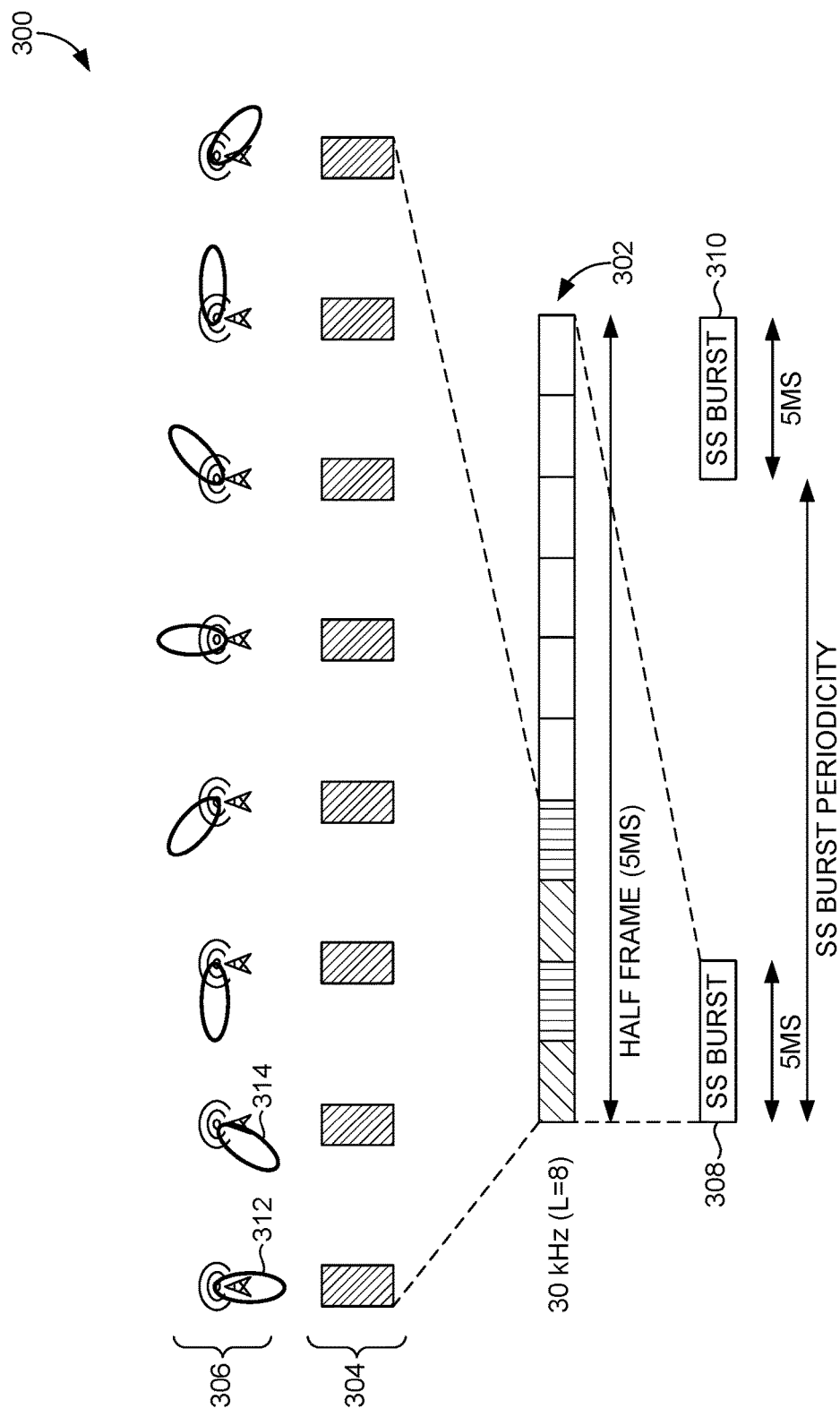
FIG. 3 illustrates a diagram of beam sweeping in accordance with an embodiment of the invention.

Continuing, FIG. 3 is a diagram 300 illustrating beam sweeping in accordance with an embodiment. As shown in the signal waveform 302, an access point, such as the access point 214 shown in FIG. 2, propagates a plurality of SS blocks 304 in a plurality of beams 306, which are transmitted in multiple directions, wherein the plurality of SS blocks 304 may together comprise an "SSB burst." A single SS burst 308 may be transmitted during a time slot. In some embodiments, as shown, the single SS burst 308 be transmitted during a time slot lasting 5 milliseconds (ms). In some embodiments, the SS burst periodicity may comprise a plurality of SS bursts, including the SS burst 308. The SS burst periodicity may also be referred to as an interval of the single SS burst 308. An additional SS burst 310 may be similarly transmitted subsequent to, or simultaneous with, the single SS burst 308.

Each signal waveform 302 may include the beams 306 as transmitted in a plurality of directions for one cell site, in embodiments. In some embodiments, each of the beams 306 may be transmitted or oriented in a plurality of directions, with each beam being initially transmitted or oriented in a different preset direction. In some embodiments, each of the beams 306 may be transmitted or oriented in a plurality of directions for a cell site. Of the plurality of beams, a first beam 312 may be transmitted in a first direction, for example, in the signal waveform 302. The direction of the first beam 312 may, in some embodiments, be different than a direction of the second beam 314, and/or may be different in direction relative to any, or all, of the remainder of the beams 306.

The additional SS burst 310 may provide an additional or different signal waveform that includes additional beams in a plurality of directions. These additional beams, in some embodiments, may include the second beam 314 in a second or third direction. In some embodiments, the first beam 312 may be transmitted in a second direction different than the first direction, for example, in the additional SS burst 310. In other embodiments, the second beam 314 may not be an additional signal waveform. In some embodiments, the second beam may be a different signal waveform from the first beam. The additional SS burst 310 therefore may alter the positions of at least one beam in accordance with the methods described herein.

Although the beams discussed in the above example of FIG. 3 are shown to be in different directions, at least one of the beams 306 may be transmitted or oriented in the same or similar direction, such that at least one of the beams 306 may overlap, at least partially, in coverage. As such, FIG. 3 is merely on example and should not be construed as limiting.

Figure 4A:
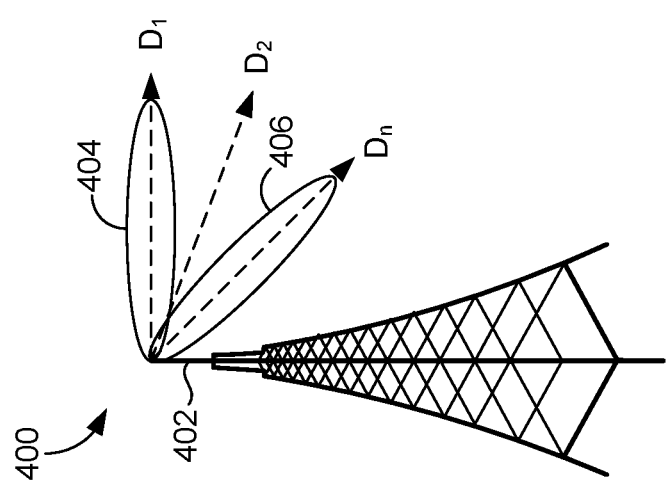
FIGS. 4A-C are an exemplary wireless communication system in accordance with an embodiment of the invention.
Figure 4B:
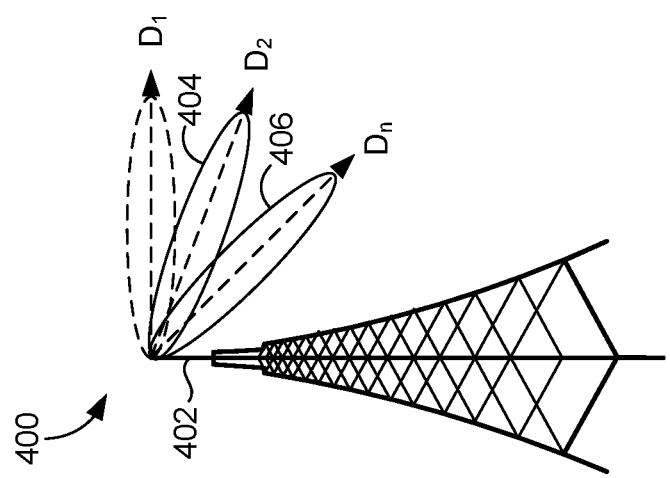
Figure 4C:
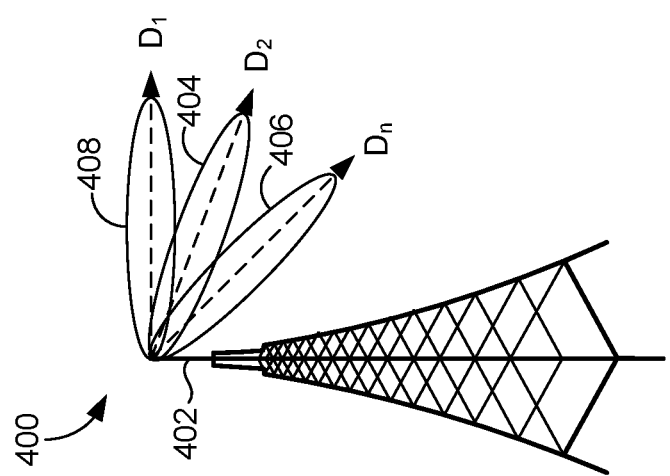

Continuing to FIGS. 4A-4C, FIG. 4A depicts an exemplary wireless communication system 400 at an initial state, in accordance with an embodiment. An access point 402 (e.g., access point 214 of FIG. 2) may transmit a first beam 404 with a boresight that is oriented in a first direction D1. Additional beams 406 (although shown has one beam for simplicity) may be transmitted from the access point 402 with the boresight of each of the additional beams 406 being oriented in any number of directions, designated in FIGS. 4A-4C, as direction DN. Although additional beams 406 are illustrated in direction DN, and DN is shown to illustrate one direction, it is contemplated that DN represents more than one direction and is shown as a single direction for simplicity of the figures. For the purposes of FIGS. 4A-4C, a second direction D2 illustrates a direction that is different from the first direction D1. Although the second direction D2 is different than the first direction D1, using a boresight of the beams in such direction herein as a measure of direction, it will be understood that there may be coverage overlap between a beam oriented in the second direction D2 and a beam oriented in the first direction D1, for example. As such, the figures are not to be construed as limiting.

While FIG. 4A illustrates an initial state, FIG. 4B illustrates a second state. In FIG. 4B, the first beam 404 that was oriented in the first direction D1, has become associated with the second direction D2. Specifically, first beam 404 now has the boresight oriented in the second direction D2. The first beam 404 may become associated with the second direction D2 when the base station has determined, based on receipt and/or information encoded in at least one feedback signal from at least one UE (not shown in FIG. 4B), that the first beam is at or above a service threshold when the boresight is oriented in the first direction D1. Subsequently, the base station may associate the first beam 404 with the second direction D2. As shown in the example of FIG. 4B, the second direction D2 is a different direction from the first direction D1, using the boresight of the first beam 404 as an indicator of direction. In other words, the second direction D2 may be at an angle shift from the first direction D1. As used herein, the angle shift refers to an angle measured between the boresight as aligned with the first direction D1 and the boresight as aligned with the second direction D2. In one example as shown, the angle formed between the boresight when oriented in the first direction D1 and the boresight when oriented in the second direction D2 is approximately 43 degrees (i.e., the angle formed between the first and second directions D1 and D2).

In some embodiments, it will be understood that there may be a geographic overlap in the coverage area provided when the first beam 404 is oriented in the first direction D1 and when the first beam 404 is (i.e., at another time) oriented in the second direction D2. For example, the boresight of the first beam 404 may be oriented in the first direction D1 as shown in FIG. 4A and may be over utilized, as previously described herein, such that the service threshold is met and/or exceeded. For example, in some embodiments the number of UE may exceed the service threshold, e.g., when a high number of UE may be served by a beam. In one such embodiment, the first beam 404 may be re-oriented to transmit toward the second direction D2 in order to offload at least on UE in order to address the over utilization by reducing the quantity of UE that are served by the first beam 404. Offloading may include submitting a beam in a second direction D2 so a reduced quantity of UE are served by a beam. When the first beam 404 is re-oriented to be transmitted with a boresight directed to the second direction D2, at least one UE may be offloaded from the first beam 404. However, in some embodiments, at least one UE that was initially served by a coverage area of the first beam 404, when previously oriented in the first direction D1, may remain within another coverage area formed when the boresight of the first beam 404 is oriented in the second direction D2. Therefore, there may be a geographic overlap in the coverage area provided when the first beam 404 is oriented in the first direction D1 and when the first beam 404 is (i.e., at another time) oriented in the second direction D2. The amount of coverage area overlap may be used to facilitate partial offloading of UE from a beam and may be customized (e.g., 90% overlap, 75% overlap, 50% overlap, 35% overlap, 5% overlap) to manipulate the quantity of UE that are being offloaded from a beam. In other embodiments, all UE are fully offloaded from a beam when there is a direction change, such that there is no overlap, or negligible overlap, between the coverage areas formed before and area a directional change of a beam.

Continuing, FIG. 4C illustrates the second beam 408 that is transmit with the boresight oriented in the first direction D1. In some embodiments, the second beam 408 may be transmitted in the first direction D1 subsequent to a base station causing the first beam 404 to be transmit in the second direction D2. Transmitting the second beam 408 in the first direction D1 may ensure that any UE that are physically located within the coverage area of the first direction D1 continue to have network access through the second beam 408, even though the direction of orientation of the first beam 404 has changed and may have caused, intentionally or otherwise, offloading of some portion of UE or all UE. For example, in some embodiments, UE (not shown in FIG. 4C) that where being served by the first beam 404 when the boresight of the first beam 404 was previously oriented in the first direction D1 may be served by the second beam 408 when oriented in the first direction D1.

Figure 5A:
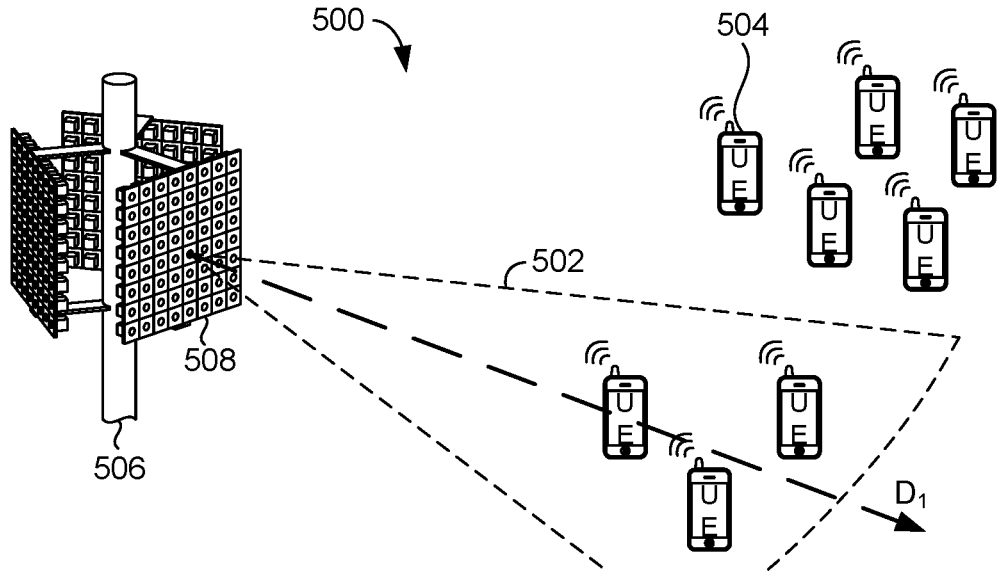
FIGS. 5A and 5B depict intra-cell beam sweeping with a direction change, in accordance with an embodiment of the invention.
Figure 5B:
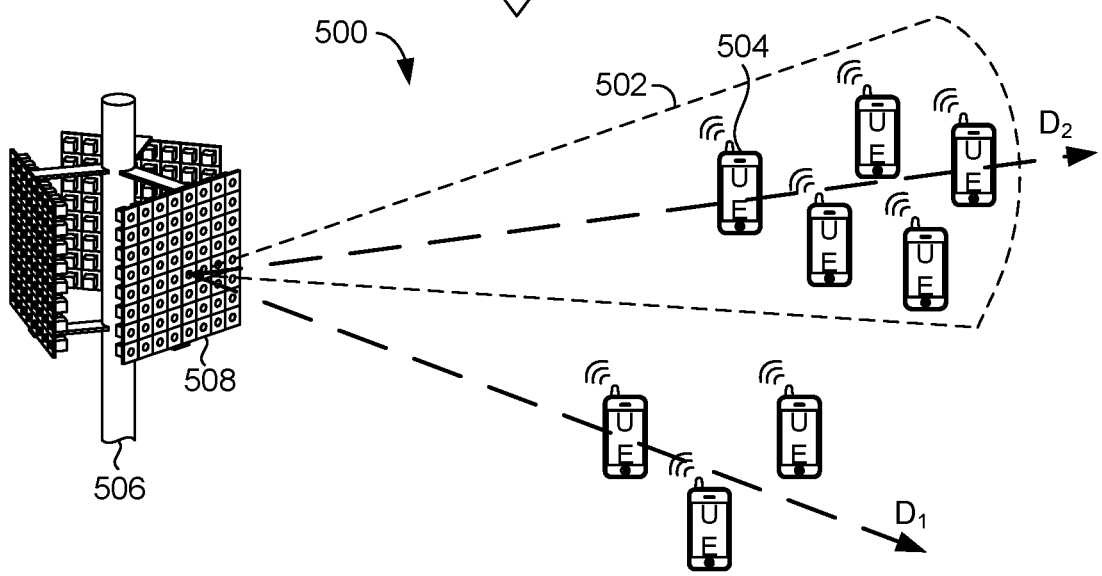

Turning now to FIGS. 5A and 5B, a diagram illustrates a system 500 for modifying beam direction based on a service threshold. In FIGS. 5A and 5B, a base station (not shown in FIGS. 5A and 5B) may control an access point 506, and elements of the antenna 508. In some embodiments, the antenna 508 may be a full dimension multiple input multiple output (FD-MIMO) antenna (e.g., Massive MIMO, or active antenna array), or any antenna or antenna array capable of beamforming. The base station may modify the direction of a first beam 502 formed by the antenna 508, by changing the boresight oriented in a first direction D1 to being oriented in a second direction D2. As shown in FIGS. 5A and 5B, the modification of the direction of the first beam 502 comprises associating the boresight of the first beam D1 with a second direction D2 that is different from the first direction D1. In this embodiment, the first beam 502 has the boresight oriented in the first direction D1 and is associated with a lower number of UE 504 than when the boresight of the first beam 502 is oriented in the second direction D2.

In FIG. 5A, the first beam 502 is transmitted from access point 506 via antenna 508. A first set of UE 504 are within the coverage area of the first beam 502 provided by first beam 502 as oriented with a boresight in the first direction D1. Each of the UE in the first set of UE 504 may transmit a feedback signal in response to receiving the first beam 502. Each feedback signal received may be used by a base station managing the access point 506 in order to determine whether the first beam 502 is at or below a service threshold (i.e., underutilized). In the example of FIG. 5A, the first set of UE 504 include three individual UE. As such, each of the three UE in the first set of UE 504 may provide a separate feedback signal to the base station, via the first beam 502 of access point 506. The base station may reference a predefined service threshold that specifies a quantity of 15 UE are desired for the first beam 502 in order to prevent underutilization of the beam. Then, based on the feedback signals received, the base station determines that the first beam 502 as oriented in the first direction only detects the three UE such that the service threshold is not met. For example, using unique user device identifiers that may be included or encoded in each of the feedback signals, as discussed previously, the base station may determine a total number of UE served by the first beam 502 when oriented in the first direction D1. As this quantity does not meet the service threshold, the base station may determine that the first beam should be changed in direction.

It will be understood that the number of UE depicted in the figures is merely an example and is not limiting in number or scale. Similarly, though "sets" of UE are discussed, a "set" may comprise only one UE, or may comprise 100 UE, such that the term is only used to discuss the figures with clarity and the term is not intended to be limiting.

Next, FIG. 5B illustrates the system 500 shifting the direction of the first beam 502 based on the determination that the service threshold was not met by the first beam 502 when oriented in the first direction D1. The first beam 502 may be associated with a second direction D2, and further based on this association, the boresight of the first beam 502 may be re-oriented in a second direction D2. Subsequent to associating the first beam 502 with the second direction D2, thus, the first beam 502 may be transmitted with the boresight oriented in the second direction D2. As shown in the example of FIG. 5B, the first beam 502 that is oriented in the second direction D2 provides a different coverage area than in the first direction D1 based on the change in direction. In the example, a second set of UE 505 are now served by the first beam 502. Although the coverage areas are illustrated to be completely different in FIG. 5B, it is contemplated that the coverage area in the second direction D2 may have some overlap with the first direction D1.

In some embodiments, subsequent to the first beam 502 being oriented in the second direction D2, the base station may again determine that the first beam 502 does not satisfy the service threshold. In such embodiments, the first beam 502 may be associated with a third direction that is different from the first and second directions D1 and D2. In embodiments, the coverage area of the first beam 502 associated with first direction D1 and the coverage area of the first beam 510 associated with the second direction D2 may overlap, such that a portion of UE in the first set of UE 504 or a portion of the second set of UE 505 physically resides in both coverage areas. In these embodiments where at least one of the first set of UE 504 or at least one of the second set of UE 505 fall into an overlap, a third direction may be determined or calculated for shifting the direction of the first beam 502, wherein the third direction is different from the first and second directions D1 and D2. In this embodiment, the third direction may be determined or calculated so that the coverage area formed by transmitting the first beam 502 with a boresight oriented in the third direction does not include the physical location of the at least one UE that resides in an overlapping coverage area.

In some embodiments, subsequent to transmitting the first beam 502 in the first direction D1, no feedback signal is received by the base station for the first beam 502. In this embodiment, no unique user device identifiers may be received via the first beam 502. In other words, when no feedback signals are received, the base station may determine that the first beam 502 is currently not providing service to any UE (e.g., a quantity of zero UE). Accordingly, the first beam 502 is being underutilized. As such, the base station may determine that the first beam 502 does not meet the service threshold (e.g., when service threshold is greater than zero quantity of desired UE). In response, the first beam 502 may be associated with a second direction D2 that is different than the first direction D1. Subsequently, the plurality of beams may be caused to be transmitted in the plurality of directions, with the first beam transmitted in the second direction D2.

Figure 6:
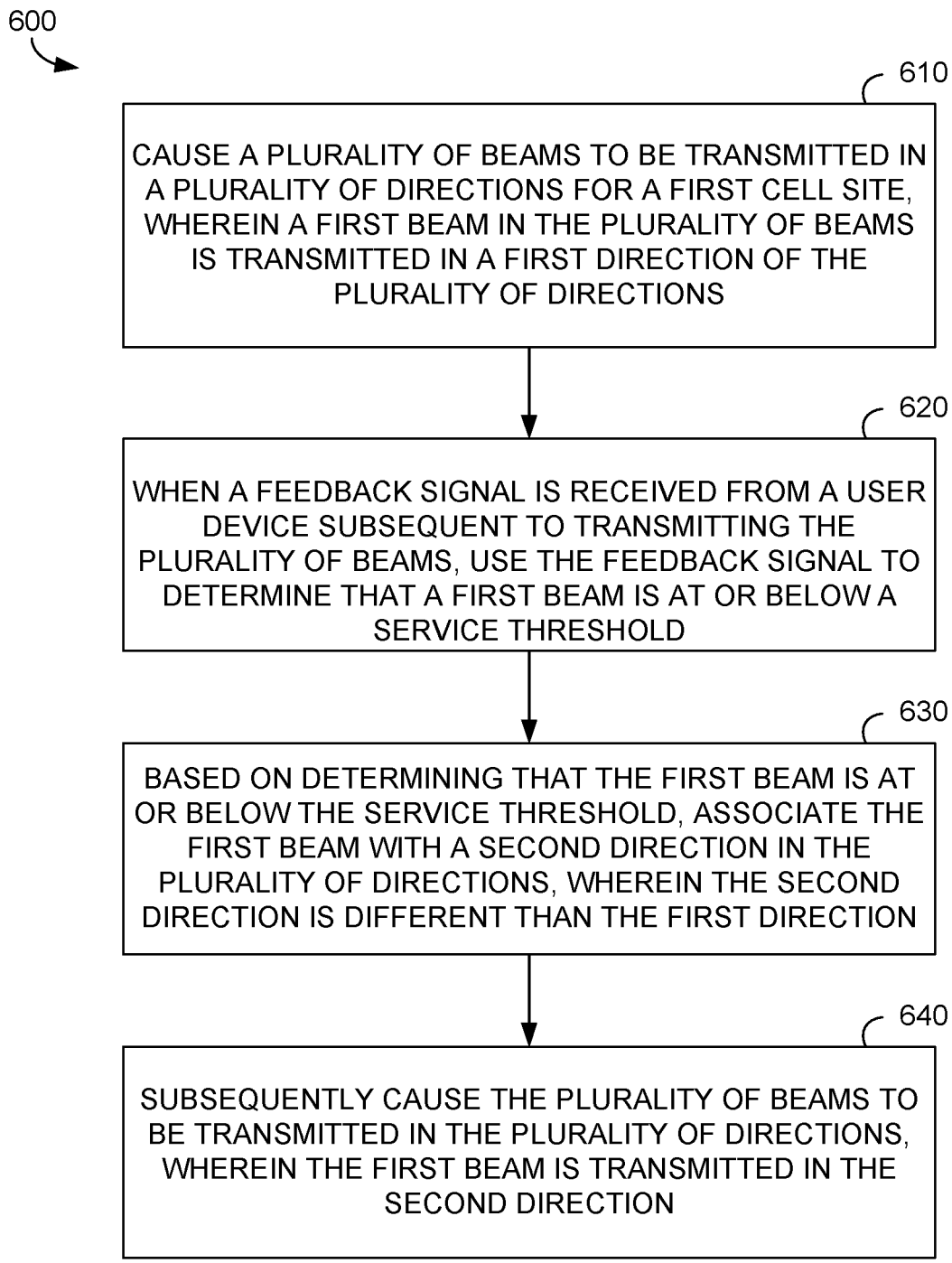
FIG. 6 depicts a block diagram of an exemplary method of optimizing intra-cell beam sweeping, in accordance with an embodiment of the invention.

Turning now to FIG. 6, an exemplary method 600 for optimizing intra-cell beam sweeping is presented. The method 600 discussed may be performed via one or more of the components described in FIGS. 1-5. As such, the method 600 is discussed briefly for brevity, though it will be understood that the previous discussion and details described therein may be applicable to aspect of the method 600 of FIG. 6. Additionally or alternatively, it will be understood that the method 600 discussed herein may be implemented or performed via the execution of computer-readable instructions stored on computer readable media, by one or more processors. For example, the method 600 may be performed using one or more executable portions configured to perform the method 600 when executed via one or more processors.

At block 610, the method 600 comprises causing a plurality of beams to be transmitted in a plurality of directions for a first cell site, wherein a first beam in the plurality of beams is transmitted in a first direction of the plurality of directions. Then, when a feedback signal is received from a user device subsequent to transmitting the plurality of beams, shown at block 620, the method 600 comprises using the feedback signal to determine that a first beam is at or below a service threshold. Based on the determination that the first beam is at or below the service threshold, the method 600 may associate the first beam with a second direction in the plurality of directions, wherein the second direction is different than the first direction, as illustrated at block 630. Then, at block 640, the method may subsequently cause the plurality of beams to be transmit in the plurality of directions, wherein the first beam transmitted in the second direction.

Regarding FIGS. 1 through 6, it will be understood by those of ordinary skill in the art that the environment(s), system(s), and/or methods(s) depicted are not intended to limit the scope of use or functionality of the present embodiments. Similarly, the environment(s), system(s), and/or methods(s) should not be interpreted as imputing any dependency and/or any requirements with regard to each component, each step, and combination(s) of components or step(s) illustrated therein. It will be appreciated by those having ordinary skill in the art that the connections illustrated the figures are contemplated to potentially include methods, hardware, software, and/or other devices for establishing a communications link between the components, devices, systems, and/or entities, as may be utilized in implementation of the present embodiments. As such, the absence of component(s) and/or steps(s) from the figures should not be interpreted as limiting the present embodiments to exclude additional component(s) and/or combination(s) of components. Moreover, though devices and components in the figures may be represented as singular devices and/or components, it will be appreciated that some embodiments can include a plurality of devices and/or components such that the figures should not be considered as limiting the number of a devices and/or components.

Many different arrangements of the various components depicted, as well as components not shown, are possible without departing from the scope of the claims herein. Embodiments of the technology have been described with the intent to be illustrative rather than restrictive. Alternative embodiments will become apparent to readers of this disclosure after and because of reading it. Alternative methods of implementing the aforementioned subject matter may be performed without departing from the scope of the claims herein. Certain features and sub-combinations are of utility and may be employed without reference to other features and sub-combinations, which is contemplated as within the scope of the claims.

The invention claimed is:

1. A method for optimizing intra-cell beam sweeping, the method comprising:
performing intra-cell beam sweeping by causing a plurality of beams to be transmitted in a plurality of directions for a first cell site, wherein a first beam in the plurality of beams is transmitted in a first direction of the plurality of directions, wherein the plurality of beams form a synchronization signal block (SSB) burst;
when a feedback signal is received from a user device subsequent to transmitting the plurality of beams:
determining, by a base station, that the first beam is at or below a service threshold based on the feedback signal, wherein the service threshold defines a minimum user device quantity for preventing underutilization;
determining, by the base station, a second direction that is different from the first direction, wherein to determine the second direction, the base station identifies a desired angle shift measured from a boresight of the first beam when aligned with the first direction to the boresight of the first beam when aligned with the second direction, wherein when the first beam is to be transmitted when aligned with the second direction, the first beam is predicted to at least meet the service threshold based on previously-received feedback signals from other user devices;
based on the base station determining that the first beam is at or below the service threshold, associating the first beam with the second direction; and
subsequently performing the intra-cell beam sweeping by causing the plurality of beams to be transmitted in the plurality of directions, wherein the first beam is transmitted in the second direction.

2. The method of claim 1, wherein each beam in the plurality of beams is transmitted in a different preset direction of the plurality of directions.

3. The method of claim 1, wherein the feedback signal is a channel state information (CSI) signal transmitted from the user device.

4. The method of claim 3, wherein the feedback signal includes a unique user device identifier of the user device, wherein the user device uses the first beam to transmit the feedback signal.

5. The method of claim 1, further comprising, subsequent to transmitting the first beam in the second direction at the first cell site, receiving a subsequent feedback signal from an additional user device, and determining the subsequent feedback signal to be above the service threshold.

6. The method of claim 1, wherein when no feedback signal is received from a user device subsequent to transmitting the plurality of beams:
determine that the first beam is at or below the service threshold;
associate the first beam with the second direction; and
subsequently causing the plurality of beams to be transmitted in the plurality of directions, wherein the first beam is transmitted in the second direction.

7. One or more non-transitory computer-readable media comprising a method for dynamically optimizing intra-cell beam sweeping, the media comprising:
performing intra-cell beam sweeping by causing a plurality of beams to be transmitted in a plurality of directions at a cell site, wherein a first beam in the plurality of beams is transmitted in a first direction of the plurality of directions, wherein the plurality of beams form a synchronization signal block (SSB) burst;
receiving a first feedback signal subsequent to transmitting the plurality of beams, wherein the first feedback signal includes a unique user device identifier associated with a user device;

using the first feedback signal, determining, by a base station servicing the cell site, that the first beam is below a service threshold based on a total quantity of a plurality of user devices that are served by the first beam, wherein the service threshold defines a minimum user device quantity for preventing underutilization;

determining, by the base station, a second direction that is different from the first direction, wherein to determine the second direction, the base station identifies a desired angle shift measured from a boresight of the first beam when aligned with the first direction to the boresight of the first beam when aligned with the second direction, wherein when the first beam is to be transmitted in the second direction, the first beam is predicted to at least meet the service threshold based on previously-received feedback signals from other user devices;

based on determining that the first beam is below the service threshold, associating the first beam with the second direction; and subsequently performing the intra-cell beam sweeping by causing the plurality of beams to be transmitted in the plurality of directions, wherein the first beam is transmitted in the second direction.

8. The one or more non-transitory computer-readable media of claim 7, wherein the service threshold is predefined and is specific to the first beam, the first direction, the plurality of beams, the plurality of directions, or the cell site.

9. The one or more non-transitory computer-readable media of claim 7, wherein the quantity of the one or more user devices that are served by the first beam is determined by a gNodeB that controls the cell site, wherein the gNodeB recognizes the quantity of the one or more user devices served by the first beam as a total number of the unique user device identifiers identified in the first feedback signal.

10. The one or more non-transitory computer-readable media of claim 7, further comprising:

receiving a second feedback signal subsequent to causing the first beam to be transmitted in the second direction; and determining an additional user device is present with the user device based on the second feedback signal.

11. The one or more non-transitory computer-readable media as in claim 7, further comprising:

receiving a second feedback signal subsequent to causing the first beam to be transmitted in the second direction, wherein the second feedback signal includes a unique user device identifier for each of the plurality of user devices;

using the second feedback signal, determining that the first beam is below the service threshold;

based on determining that the first beam is below the service threshold, associating the first beam with a third direction in the plurality of directions, wherein the third direction is different than the first and second directions.

12. The one or more non-transitory computer-readable media of claim 11, wherein the second feedback signal includes at least the same unique user device identifier of the user device from the first feedback signal, and wherein the third direction is calculated to be different than the first and second directions.

13. The one or more non-transitory computer-readable media of claim 7, further comprising offloading at least one of the plurality of user devices from the first beam to a second beam.

14. The one or more non-transitory computer-readable media of claim 7, wherein subsequent to causing the first beam to be transmitted in the second direction, transmitting a second beam in the first direction.

15. The one or more non-transitory computer-readable media of claim 7, wherein a gNodeB controlling the cell site performs the method each time the synchronization signal block (SSB) burst is repeated.

16. The one or more non-transitory computer-readable media of claim 7, wherein a gNodeB performs the method for each of the plurality of beams.

17. A system comprising:

a gNodeB configured to control a cell site having an antenna for transmitting a plurality of beams in a plurality of directions to form a synchronization signal block (SSB) burst; and at least one processor communicatively coupled to and co-located at the cell site of the gNodeB, wherein the at least one processor:

performs intra-cell beam sweeping by causing the plurality of beams to be transmitted in the plurality of directions, wherein a first beam in the plurality of beams is transmitted in a first direction of the plurality of directions, wherein the plurality of beams forms the synchronization signal block (SSB) burst;

receives at least one feedback signal subsequent to transmitting the plurality of beams, wherein the at least one feedback signal includes at least one unique user device identifier associated with at least one user device that is served by the first beam;

using the at least one feedback signal, determines that the first beam is below a service threshold based on a total quantity of the at least one user device that is served by the first beam, wherein the service threshold defines a minimum user device quantity for preventing underutilization;

determines a second direction that is different from the first direction, wherein to determine the second direction, the base station identifies a desired angle shift measured from a boresight of the first beam when aligned with the first direction to the boresight of the first beam when aligned with the second direction, wherein when the first beam is to be transmitted in the second direction, the first beam is predicted to at least meet the service threshold based on previously-received feedback signals from other user devices;

based on determining that the first beam is below the service threshold, associates the first beam with the second direction; and subsequently performs the intra-cell beam sweeping by causing the plurality of beams to be transmitted in the plurality of directions, wherein the first beam is transmitted in the second direction.

* * * * *